United States Patent [19]
Brooks

[11] Patent Number: 5,083,063
[45] Date of Patent: Jan. 21, 1992

[54] RADIATION GENERATOR CONTROL APPARATUS

[75] Inventor: Steven D. Brooks, Hants, England

[73] Assignee: De La Rue Systems Limited, England

[21] Appl. No.: 567,278

[22] Filed: Aug. 14, 1990

[30] Foreign Application Priority Data

Aug. 16, 1989 [GB] United Kingdom ............... 8918718

[51] Int. Cl.$^5$ ............................................. H05B 37/02
[52] U.S. Cl. .................................. 315/294; 315/134; 315/153; 315/370; 315/322; 382/7
[58] Field of Search ............... 315/294, 295, 297, 133, 315/153, 315, 317, 320, 322, 134; 250/553, 571, 578.1

[56] References Cited

U.S. PATENT DOCUMENTS 3,763,394 10/1973 Blanchard ........................ 315/294

FOREIGN PATENT DOCUMENTS 62-8580 1/1987 Japan .
1588868 4/1981 United Kingdom ............... 315/134

OTHER PUBLICATIONS

*IBM Technical Disclosure Bulletin,* "Adjustment of LED Current in Optical, Document Sensor", vol. 30, No. 7, Dec. 1987, pp. 130–131.

*Primary Examiner*—Eugene R. Laroche
*Assistant Examiner*—Tan Dinh
*Attorney, Agent, or Firm*—Ostrolenk, Faber, Gerb & Soffen

[57] ABSTRACT

Apparatus for controlling operation of a number of radiation generator assemblies comprises a store for storing calibration values for respective assemblies, respective switches, a digital to analogue converter (D/A) and control means. The switches are coupled between the radiation generator assemblies and D/A. The control means selectively addresses the store and controls the switches such that when a switch is closed a corresponding calibration value is supplied to the D/A to energize the generator assembly. Such apparatus is typically for use in monitoring of passage of sheets such as in banknote sorting.

8 Claims, 1 Drawing Sheet

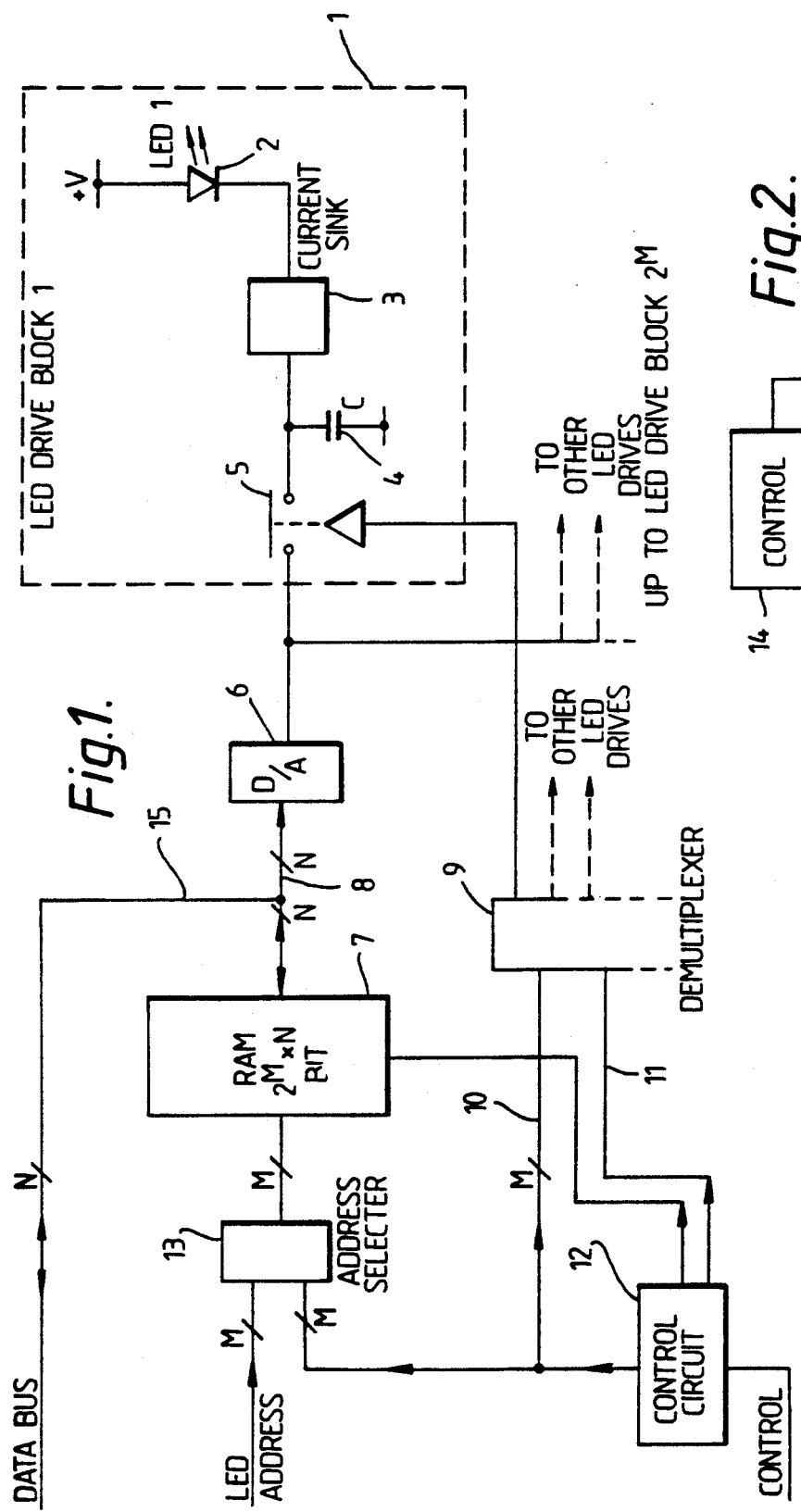
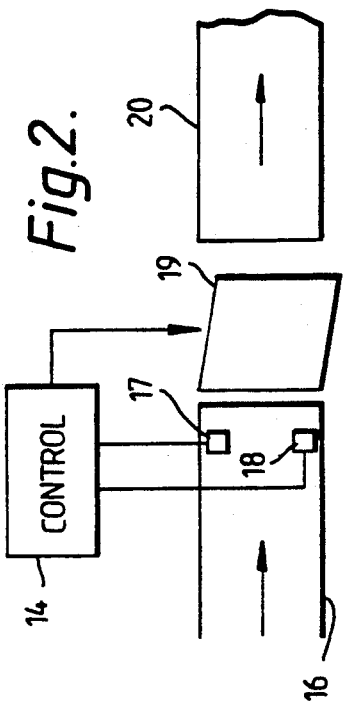

RADIATION GENERATOR CONTROL APPARATUS

FIELD OF INVENTION

The invention relates to radiation generator control apparatus for controlling operation of a number of radiation generator assemblies, for example including light emitting diodes.

DESCRIPTION OF THE PRIOR ART

In the field of sheet handling, such as banknote counting and sorting, it is common to monitor the passage of sheets by using a number of radiation generators such as light emitting diodes (LED) and associated detectors positioned on either side of the path of the sheets. As sheets pass between a diode/detector pair, the intensity of the radiation from the diode will be reduced and this can be used to provide an indication to the control system of the arrival of a sheet. It is important, however, that the intensity of radiation generated by each LED is closely controlled and in practice this means that each LED must be supplied with its own calibration drive current.

In one known system, a microprocessor is coupled with a single digital to analogue converter and a display driver integrated circuit to convert the analogue voltage from the converter to a current. The display driver integrated circuit has six output channels, each of which can supply up to 50 mA. Two of these channels are used to drive LEDs. As there are more than two LEDs the LEDs are driven as two series connected LED chains. Before the state of any sensor can be read, the microprocessor has to read the appropriate calibration current from its memory, write this value to the selected LED chain, and then poll the relevant sensor receiver or detector. The main disadvantage with this system is that the sensors have to be polled, resulting in high software execution time overhead and the problem that not all sensors are energized simultaneously making it difficult to provide microprocessor interrupts upon incidence of note edges.

In another system, the LED driver circuit consists of two digital to analogue converters driving two current sources (i.e. sourcing current from the positive supply), each of which can supply up to 200 mA to LED anodes and 16 semiconductor switches to select the LED cathode lines. Only one LED cathode l. e may be selected at a time. The microprocessor has to read the appropriate calibration current from its memory, write this value to the relevant digital to analogue converter and then select the LED cathode line before the detector state may be read. Once again, this suffers from the problem of having to poll sensors and it is also difficult to provide microprocessor interrupts upon incidence of note edges.

In another system, the LED driver circuit consists of 16 LED channels, each of which has its own D-A converter. Thus, all sensors may be energized simultaneously and interrupts may be generated easily from sensor transitions. The disadvantage of this system is that one D-A is needed for each LED and this is costly (especially if high resolution is deemed necessary).

JP-A-62-8580 describes a control system for LED's using a microcomputer in which each LED requires an analogue to digital converter. In IBM Technical Disclosure Bulletin 30(1987)Dec No. 7 an optical document sensing unit is described which provides a complete driving circuit for each LED.

SUMMARY OF THE INVENTION

In accordance with the present invention, radiation generator control apparatus for controlling operation of a number of radiation generator assemblies comprises a store for storing calibration values for respective radiation generator assemblies, a respective switch coupled to each radiation generator assembly, a digital to analogue converter connected to the output of the store and in parallel with the input to each switch and control means for selectively addressing the store and controlling the switches in sequence so that when the switch associated with each generator assembly is closed, the corresponding calibration value is supplied to the digital to analogue converter to energize the generator assembly.

We have devised a new control apparatus in which a single digital to analogue converter is used for any number of generator assemblies. During normal use, each generator assembly is substantially continuously supplied with its calibration current and apart from the time at which the calibration values are initially loaded into the store, no significant software intervention is needed and the apparatus can be completely fabricated in hardware. Consequently, there is no software execution time overhead to enable the detectors to be read. Furthermore, because microprocessor interrupts may be easily generated on the incidence of note edges, sensors incorporated in the generator assemblies can be used to detect the arrival of sheets easily and very accurately. This is particularly important in high speed sheet handling devices.

Typically, each radiation generator assembly comprises a capacitor connected to the switch which temporarily stores a charge corresponding to the voltage generated by the D/A converter. Further, each generator assembly will generally include a radiation generator, such as a LED and a current sink which provides a drive current for the radiation generator.

In the preferred arrangement, the apparatus further comprises a demultiplexer having outputs connected to each switch and an input connected to the control means for receiving the same address as is supplied to the store. This simplifies the hardware needed to synchronize the addressing of the appropriate part of a store and the corresponding switch.

BRIEF DESCRIPTION OF THE DRAWINGS

An example of radiation generator control apparatus and sheet handling apparatus incorporating such apparatus will now be described with reference to the accompanying drawings, in which:

FIG. 1 is a block diagram of the control apparatus; and

FIG. 2 is a schematic, partial view of sheet handling apparatus.

EMBODIMENT

The apparatus shown in FIG. 1 comprises a number of LED drive blocks of which one (identified with the numeral 1) is shown. Each drive block contains a light emitting diode 2 which, when energized, generates an infra red beam, the LED being connected between a high voltage line and a current sink 3. The drive block also contains a capacitor 4 and a switch 5. Each of the switches 5 is connected in parallel to a digital to analogue converter (D/A) 6 having an input coupled to the output of a RAM 7 by an N bit data line 8. The apparatus can handle up to $2^M$ drive blocks and so the RAM 7 contains $2^M$ addresses at which calibration values can be stored.

Each switch 5 is connected to a respective output of a demultiplexer 9. An M bit address signal on a line 10 is fed to an address input port which causes an activating signal on a line 11 from a control circuit 12 to be coupled to the respective, addressed output line so as to activate the appropriate switch 5. The address output from the control circuit 12 is also fed to an address selector 13 which can be activated to pass either the address signal from the control circuit 12 to the RAM 7 or an address signal from a remote control microprocessor 14 (FIG. 2).

At start-up the control microprocessor 14 causes appropriate calibration values to be loaded in the RAM 7. This is achieved by switching the address selector 13 to receive addresses from the control microprocessor 14 and for the RAM 7 to receive data on a data bus 15. The addresses in the RAM 7 are sequentially selected and at each address the appropriate calibration value, corresponding to a calibration current for the respective drive block, is loaded into the selected address. The calibration values are chosen so that the intensity of radiation generated by each LED is substantially the same.

After this loading stage, the address selector 13 is switched to receive addresses from the control circuit 12 and the circuit 12 is then activated. The control circuit 12 automatically cycles through all the RAM addresses causing data (calibration values) to be output to the D/A converter 6 and at the same time causing the appropriate switches 5 to be activated via the demultiplexer 9. The voltage level from the D/A converter is impressed upon the capacitor 4 of the appropriate, selected drive block which retains the value until it is refreshed again. The current sink 3 converts this voltage value to an LED drive current.

It will be seen therefore that in normal operation, the components shown in FIG. 1 can all be hardware components with the control circuit 12 simply causing a sequence of addresses to be repeatedly applied to the RAM 7 and the demultiplexer 9. Each capacitor 4 retains the loaded voltage value for a time at least as long as the cycle time of the control circuit 12 so that each LED is continuously energized with its respective calibration current.

FIG. 2 illustrates schematically sheet handling apparatus, such as banknote sorting apparatus in which sheets are fed along a conveyor 16 under a pair of sensors 17, 18 connected to the control microprocessor 14. Under the conveyor 16 are positioned a pair of LED drive blocks similar to the block 1 shown in FIG. 1 so that the detectors 17, 18 receive radiation from the corresponding LEDs. As the leading and trailing edges of the sheet pass between the detectors 17, 18 and the corresponding LED drive blocks, the control microprocessor 14 is interrupted, thereby defining the position of the sheet in the apparatus. By monitoring the dimension of the sheet in this way, acceptable sheets can be passed across a diverter plate 19 to a conveyor 20. If, however, the sheet dimension is incorrect then the control microprocessor 14 causes the diverter plate 19 to drop downwardly so as to cause the incoming sheet to drop below the conveyor 20 to a reject bin.

I claim:

1. Radiation generator control apparatus for controlling operation of a number of radiation generator assemblies, the apparatus comprising a store for storing calibration values for respective radiation generator assemblies, a respective switch coupled to each radiation generator assembly, a digital to analogue converter connected to the output of the store and to the input of each switch, and control means for selectively addressing the store and controlling the switches in sequence so that when the switch associated with each generator assembly is closed, the corresponding calibration value is supplied to the digital to analogue converter to energize the generator assembly.

2. Radiation generator control apparatus according to claim 1, further comprising means for loading calibration values into the store.

3. Control apparatus according to claim 1, in which each generator assembly includes a capacitor connected to the switch which temporarily stores a charge corresponding to the voltage generated by the D/A converter.

4. Control apparatus according to claim 1, in which each generator assembly includes a radiation generator and a current sink which provides a drive current for the radiation generator.

5. Control apparatus according to claim 1, in which the calibration value is proportional to the drive current of the radiation generator.

6. Control apparatus according to claim 1 in which the radiation generator assemblies generate radiation of substantially the same intensity when energized in accordance with their calibration values.

7. Control apparatus according to claim 1, further comprising a demultiplexer having outputs connected to each switch and an input connected to the control means for receiving the same address as is supplied to the store.

8. Control apparatus according to claim 1 in which the store is a RAM.

* * * * *